United States Patent
Lim et al.

(10) Patent No.: US 8,379,657 B2
(45) Date of Patent: Feb. 19, 2013

(54) METHOD AND APPARATUS FOR SETTING UP UPLINK COMMON BEARER IN WIRELESS COMMUNICATION NETWORK

(75) Inventors: Chae-Gwon Lim, Seoul (KR); Song-Yean Cho, Seoul (KR); Han-Na Lim, Seoul (KR); Sung-Ho Choi, Suwon-si (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 12/938,517

(22) Filed: Nov. 3, 2010

(65) Prior Publication Data
US 2011/0110379 A1    May 12, 2011

(30) Foreign Application Priority Data
Nov. 6, 2009   (KR) .................. 10-2009-0107056

(51) Int. Cl.
*H04L 12/28* (2006.01)
*H04L 12/56* (2006.01)
(52) U.S. Cl. .................... 370/401; 370/395.2
(58) Field of Classification Search ........... 370/395.2, 370/400, 401
See application file for complete search history.

(56) References Cited

U.S. PATENT DOCUMENTS

| | | | |
|---|---|---|---|
| 2009/0129342 A1* | 5/2009 | Hwang et al. | 370/331 |
| 2010/0075698 A1* | 3/2010 | Rune et al. | 455/458 |
| 2010/0254399 A1 | 10/2010 | Shin et al. | |

FOREIGN PATENT DOCUMENTS

| | | |
|---|---|---|
| KR | 10-2008-0112946 A | 12/2008 |
| KR | 10-2009-0045778 A | 5/2009 |
| KR | 10-2009-0054760 A | 6/2009 |

OTHER PUBLICATIONS

J. Shin et al., Design of Session and Bearer Control Signaling in 3GPP LTE System, In: Proceedings of 68th IEEE Vehicular Technology Conference, Sep. 21-24, 2008, pp. 1-5.

* cited by examiner

*Primary Examiner* — Ronald Abelson
(74) *Attorney, Agent, or Firm* — Jefferson IP Law, LLP

(57) ABSTRACT

A method and apparatus for setting up an UpLink common bearer shared by a plurality of User Equipments (UEs) in a wireless communication network is provided. The apparatus includes a Serving GateWay (S-GW) for receiving a group identifier of a UE from a Mobility Management Entity (MME), sending a create bearer request message including the group identifier to a Packet Data Network (PDN) GateWay (P-GW), receiving a create bearer response message including UL common S5 bearer information (UL common S5 info) for a group corresponding to the group identifier from the P-GW, and sending a create bearer response message including UL common S1 bearer information (UL common S1 info) to the MME, and the P-GW for receiving the create bearer request message from the S-GW, and generating and sending the create bearer response message including the UL common S5 info.

18 Claims, 6 Drawing Sheets

METHOD AND APPARATUS FOR SETTING UP UPLINK COMMON BEARER IN WIRELESS COMMUNICATION NETWORK

PRIORITY

This application claims the benefit under 35 U.S.C. §119 (a) of a Korean patent application filed in the Korean Industrial Property Office on Nov. 6, 2009, and assigned Serial No. 10-2009-0107056, the entire disclosure of which is hereby incorporated by reference.

BACKGROUND OF THE INVENTION

1. Field of the Invention

The present invention relates to a wireless communication network. More particularly, the present invention relates to a method and apparatus for setting up an uplink common bearer in a wireless communication network.

2. Description of the Related Art

The Universal Mobile Telecommunications System (UMTS) refers to a $3^{rd}$ generation communication system that is based on Global System for Mobile Communications (GSM) and General Packet Radio Services (GPRS), and employs a Wideband Code Division Multiple Access (WCDMA) scheme. The $3^{rd}$ Generation Partnership Projects (3GPP) responsible for the standardization of UMTS has proposed the Evolved Packet System (EPS) evolution of UMTS, such as the Long Term Evolution (LTE) system. LTE is a technology for implementing high-speed packet-based communication.

FIG. 1 illustrates an architecture of a wireless communication network according to the related art. Referring to FIG. 1, the typical wireless communication network may include a macro enhanced Node B (macro eNB) 102, a Mobility Management Entity (MME) 104, a Serving GateWay (S-GW) 106, a Packet Data Network (PDN) GateWay (P-GW) 108, and a User Equipment (UE) 100.

The macro eNB 102 is a Node B that is in charge of a macro cell. With regard to this, although the macro cell refers to a cell in a typical cellular system, and the macro eNB 102 refers to a Node B for managing and controlling the macro cell, the macro cell and the macro eNB may be used so as to have the same meaning in the present disclosure for convenience in explanation. Therefore, in the following, the macro eNB and the macro cell will be collectively referred to as the macro eNB 102.

The macro eNB 102 is connected to the UE 100 over a radio channel, and controls the radio resources of that connection. For example, the macro eNB 102 may generate control information, which is required within a macro cell, as system information and broadcast the generated system information, or may allocate radio resources in order to transmit/receive data or control information to/from the UE 100. Further, the macro eNB 102 may collect channel measurement result information for a current cell and neighbor cells from the UE 100 to thereby determine if a handover is needed, and may instruct the UE 100 to perform the handover if needed. To this end, the macro eNB 102 is provided with a control protocol for radio resource control, such as a radio resource control protocol.

The MME 104 manages and controls a UE in an idle mode, and selects the S-GW 106 and the P-GW 108. In addition, the MME 104 performs roaming and authentication-related functions. The MME 104 also processes a bearer signal generated in the UE 100.

The S-GW 106 serves as a mobility anchor when a UE is handed over between macro eNBs or moves between 3GPP radio networks.

The P-GW 108 assigns an Internet Protocol (IP) address to the UE 100, performs packet data-related functions of a core network, and serves as a mobility anchor when the UE 100 moves between a 3GPP radio network and a non-3GPP radio network. Further, the P-GW 108 determines a bearer band to be provided to a subscriber, and is responsible for forwarding and routing functions for packet data.

With regard to this, the interface between the macro eNB 102 and the S-GW 106 is referred to as the S1 interface, and the interface between the S-GW 106 and the P-GW 108 is referred to as the S5 interface.

Although not shown in FIG. 1, subscription information according to UEs is stored in a Home Subscriber Server (HSS). When the UE 100 accesses the wireless communication network, the HSS transfers data regarding the UE 100 to the MME 104 so as to enable the MME 104 to use the corresponding data for control of the UE 100.

When the UE 100 is connected to the macro eNB 102, it accesses a data network, such the Internet, by using a data transmission path 110 via the macro eNB 102, the S-GW 106, and the P-GW 108.

FIG. 2 illustrates a bearer setup in which UEs transmit data through uplink bearers for the respective UEs in a wireless communication network according to the related art.

Referring to FIG. 2, the UpLink (UL) bearers for UE 1 to UE 6 200 to 210 are separate bearers that are controlled by the network respectively. In the case of the UL bearer for UE 1 200, for example, the UL radio bearer 222 for UE 1 is connected to the UL S1 bearer 224 for UE 1 at an eNB 212, and the UL S1 bearer 224 for UE 1 is, in turn, connected to a P-GW 218 through the UL S5 bearer 226 for UE 1 that is connected to the UL S1 bearer 224 for UE 1 at an S-GW 216. Consequently, data transmitted by UE 1 200 is transmitted to an IP network 220 via the UL radio bearer 222 for UE 1 (UL radio bearer for each UE)-the eNB 212-the UL S1 bearer 224 for UE 1 (UL S1 bearer for each UE)-the S-GW 216-the UL S5 bearer 226 for UE 1 (UL S5 bearer for each UE)-the P-GW 218. The UL bearers for the other UEs, that is, UE 2 202 to UE 6 210, are also connected to the IP network 220 in the same manner as described for the UL bearer for UE 1.

FIG. 3 illustrates a flow of setting up bearers for respective UEs and transmitting/receiving data through the bearers in a wireless communication network according to the related art.

Referring to FIG. 3, the wireless communication network shown in FIG. 3 includes a UE 300, an eNB 302, an MME 304, an S-GW 306, a P-GW 308, and an HSS 310. First, in step 312, the UE 300 sends an attach request message to the eNB 302. Upon receiving the attach request message, the eNB 302 delivers the attach request message to the MME 304 in step 314. In step 316, the MME 304 sends an update location request message to the HSS 310 to thereby report the identification information of the MME 304 serving the subscriber of the UE 300 to the HSS 310 and simultaneously request the HSS 310 to transfer user subscription data. In step 318, the HSS 310 includes the user subscription data in an update location ACKnowledgment (ACK) message, and delivers the user subscription data to the MME 304 by sending the update location ACK message to the MME 304. In step 320, the MME 304 sends a create bearer request message to the S-GW 306 to thereby request the S-GW 306 to create a new S1 bearer.

In the wireless communication network, the S-GW 306 and the P-GW 308, according to the related art, set up bearers according to UEs through create bearer request and response messages.

That is, upon receiving the create bearer request message from the MME 304, the S-GW 306 sends a create bearer request message, which requests the P-GW 308 to generate a UL S5 bearer, along with DownLink (DL) S5 bearer information (DL S5 info) to the P-GW 308 in step 322. In step 324, the P-GW 308 then sends a create bearer response message, which is in response to the create bearer request message in step 322, along with UL S5 bearer information (UL S5 info) to the S-GW 306. In this way, the UL S5 bearer information and the DL S5 bearer information are shared by both the S-GW 306 and the P-GW 308, and thus it can be said that the S5 bearer for UE 300 has been created.

After the S5 bearer has been created between the S-GW 306 and the P-GW 308, in step 326, the S-GW 306 sends a create bearer response message, which is in response to the create bearer request message for S1 bearer creation in step 320, along with UL S1 bearer information (UL S1 info) to the MME 304. In step 328, the MME 304 then sends a UE context setup request message, which requests the eNB 302 to transfer UE context information (UE context info) required for the eNB 302 to provide service to the UE 300, such as security information and mobility restriction information for the UE 300, along with the UL S1 info to the eNB 302. The eNB 302 performs step 330 (Radio Resource Control (RRC) connection reconfiguration) and step 332 (RRC connection reconfiguration complete) with the UE 300, thereby creating a radio bearer to be used by the UE 300. In step 334, the eNB 302 includes DL S1 bearer information (DL S1 info) in a UE context setup response message that is in response to the UE context setup request message in step 328, and delivers the DL S1 info to the MME 304 by sending the UE context setup response message to the MME 304. The MME 304 sends an update bearer request message including the DL S1 info to the S-GW 306 in step 336, and receives an update bearer response message from the S-GW 306 in step 338, in response to the update bearer request message in step 336. In this way, the UL S1 bearer information and the DL S1 bearer information are shared by both the eNB 302 and the S-GW 306, and thus it can be said that the S1 bearer for UE 300 has been created. Accordingly, in step 340, the UE 300 can transmit data to an IP network via the radio bearer (UL radio bearer for each UE)-the eNB 302-the UL S1 bearer (UL S1 bearer for each UE)-the S-GW 306-the UL S5 bearer (UL S5 bearer for each UE)-the P-GW 308.

As seen from FIGS. 2 and 3, according to the related art, each UE independently maintains its own bearer in the wireless communication network. The same is the case where a small amount of data, such as an alarm message or a power usage result report message, is intermittently transmitted, which causes an unnecessary waste of resources because memory resources, state management resources, and the like to be maintained in an S-GW and a P-GW are too large for transmitted data. Therefore, in order to improve this problem, there is a need for a method and apparatus for setting up bearers such that each UE does not independently maintain its own bearer in a wireless communication network.

SUMMARY OF THE INVENTION

An aspect of the present invention is to address at least the above-mentioned problems and/or disadvantages and to provide at least the advantages described below. Accordingly, an aspect of the present invention is to provide a method and apparatus for setting up a common bearer shared by a plurality of User Equipments (UEs) in a wireless communication network.

Further, an aspect of the present invention is to provide a method and apparatus for setting up a common bearer so as to reduce bearer management and control overhead in a wireless communication network.

In accordance with an aspect of the present invention, a method of setting up an UpLink (UL) common bearer in a Serving GateWay (S-GW) of a wireless communication network is provided. The method includes receiving a group identifier of a UE from a Mobility Management Entity (MME), sending a create bearer request message including the group identifier to a Packet Data Network (PDN) GateWay (P-GW), receiving a create bearer response message including UL common S5 bearer information (UL common S5 info) for a group corresponding to the group identifier from the P-GW, and sending a create bearer response message including UL common 51 bearer information (UL common S1 info) to the MME.

In accordance with another aspect of the present invention, a method of setting up an UL common bearer in a P-GW of a wireless communication network is provided. The method includes receiving a create bearer request message including a group identifier of a UE from a S-GW, and sending a create bearer response message including UL common S5 info for a group corresponding to the group identifier to the S-GW.

In accordance with yet another aspect of the present invention, an apparatus for setting up an UL common bearer in a wireless communication network is provided. The apparatus includes an S-GW for receiving a group identifier of a UE from a MME, for sending a create bearer request message including the group identifier to a P-GW, for receiving a create bearer response message including UL common S5 info for a group corresponding to the group identifier from the P-GW, and for sending a create bearer response message including UL common S1 info to the MME, and the P-GW for receiving the create bearer request message from the S-GW, and for generating and sending the create bearer response message including the UL common S5 info.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, a common bearer may be set up for a specific group of User Equipments (UEs) so that a plurality of UEs may use one common bearer in a wireless communication network, thereby reducing bearer management and control overhead.

That is, by setting up a common bearer for a specific group of UEs, an environment is provided, in which an unnecessary waste of memory resources, state management resources, and the like to be maintained in an Serving GateWay (S-GW) and a Packet Data Network (PDN) GateWay (P-GW) can be prevented.

Figure 4:
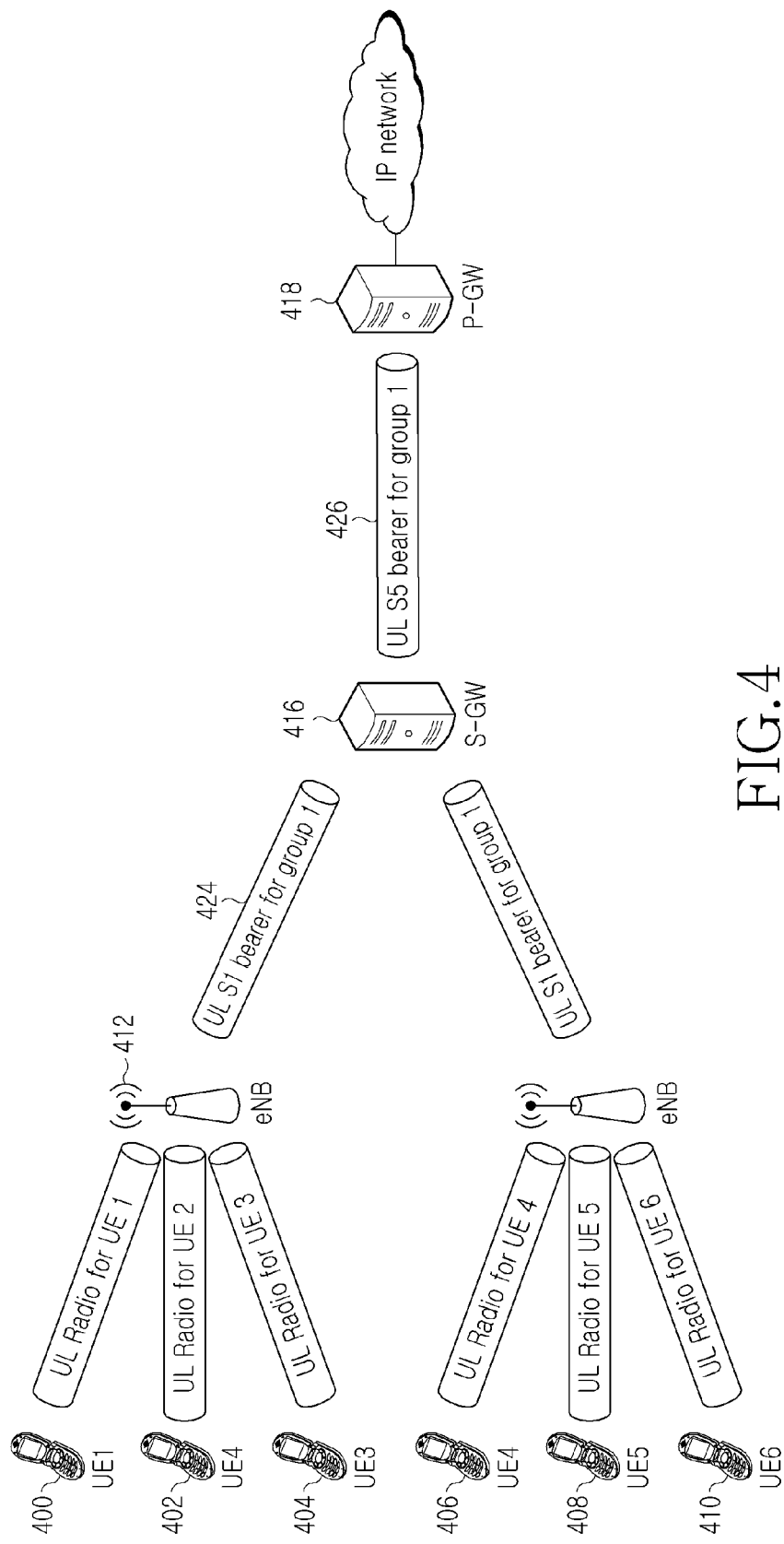
FIG. 4 is a view illustrating a bearer setup in which a plurality of UEs transmit data through a common bearer in a wireless communication network in accordance with an exemplary embodiment of the present invention.

FIG. 4 illustrates a bearer setup in which a plurality of UEs transmit data through a common bearer in a wireless communication network according to an exemplary embodiment of the present invention. In FIG. 4, it is assumed that UE1 to UE 6 400 to 410 belong to the same group (group 1).

Figure 1:
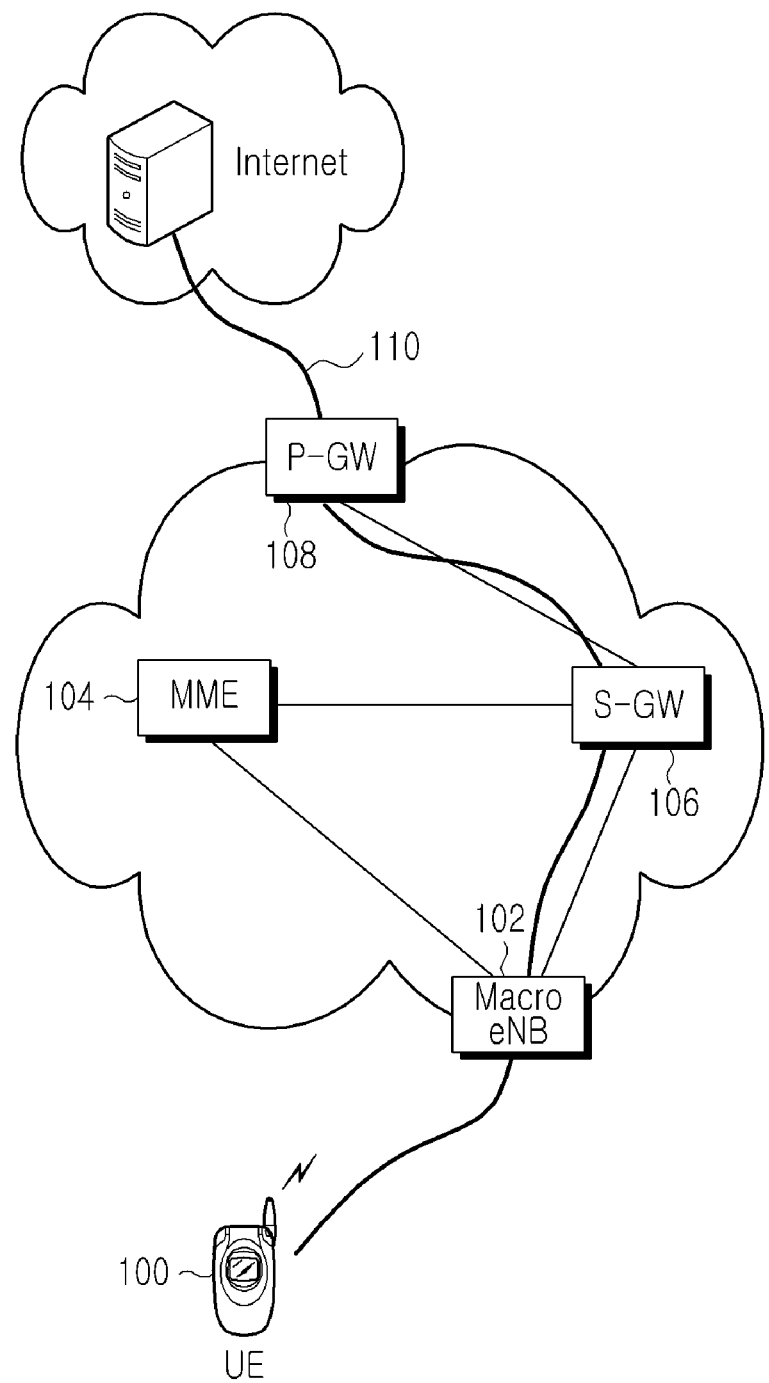
FIG. 1 is a view illustrating an architecture of a wireless communication network according to the related art.
Figure 2:
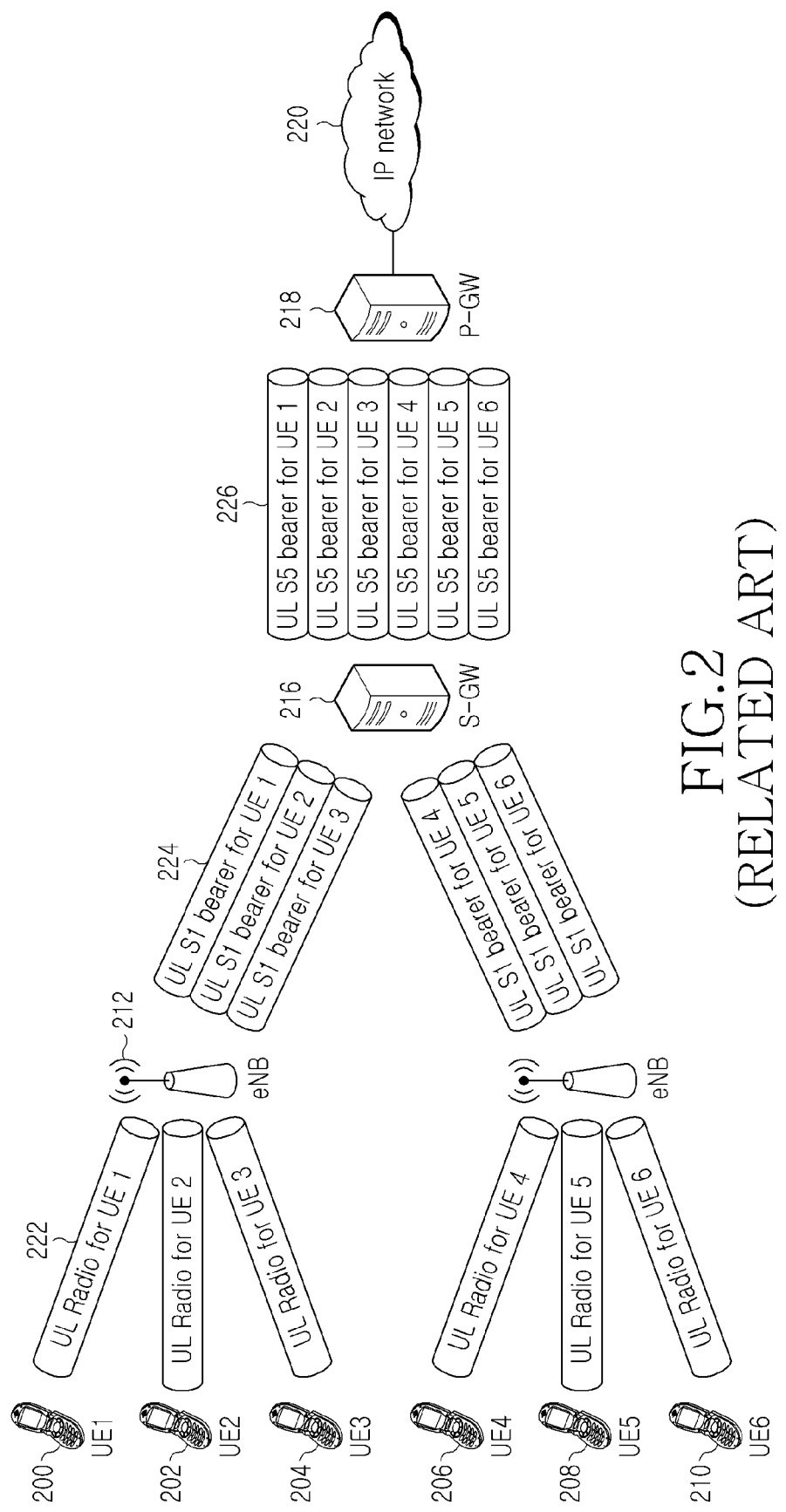
FIG. 2 is a view illustrating a bearer setup in which User Equipments (UEs) transmit data through UpLink (UL) bearers for the respective UEs in a wireless communication network according to the related art.
Figure 3:
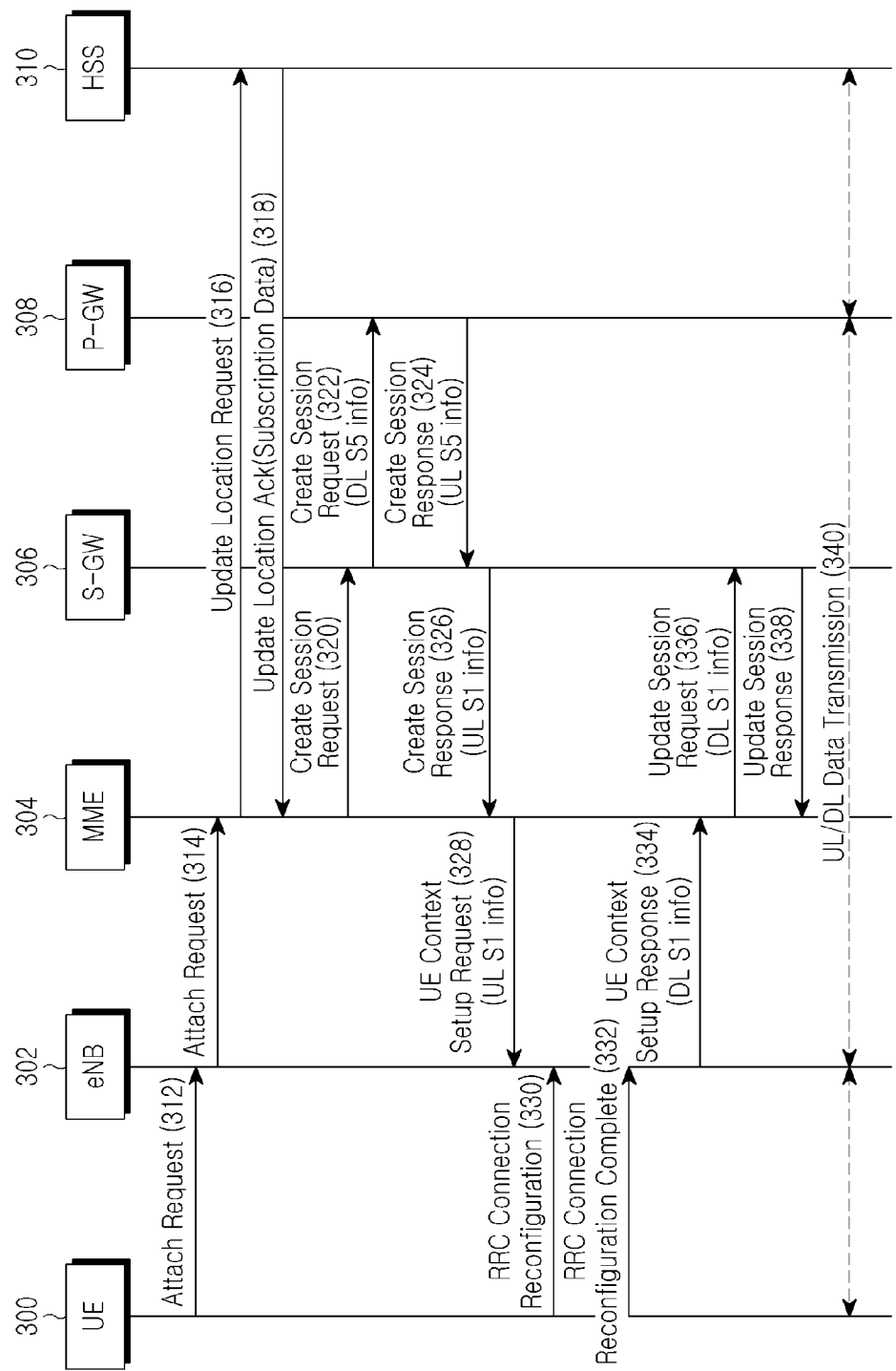
FIG. 3 is a diagram illustrating a flow of setting up bearers for respective UEs and transmitting/receiving data through the bearers in a wireless communication network according to the related art.

Referring to FIG. 4, the plurality of UEs belonging to the same group (group 1), that is, UE 1 to UE 6 400 to 410, have separate radio bearers (UpLink (UL) radio for UE1, UL radio for UE2, UL radio for UE3, UL radio for UE4, UL radio for UE5, and UL radio for UE 6) respectively, but share one UL S1 bearer (UL S1 bearer for group 1) 424 and one UL S5 bearer (UL S5 bearer for group 1) 426 with each other. Therefore, when compared to the related art wireless communication network in FIG. 2, it can be noted that the number of bearers to be managed by an S-GW 416 and a P-GW 418 is reduced from 6 (corresponding to the total number of UEs) to 1, and thus resources can also be saved accordingly.

To this end, exemplary embodiments of the present invention propose a method and apparatus for setting up a common bearer for a specific group of UEs in a wireless communication network, which will be described in more detail in the following exemplary embodiments of the present invention.

Figure 5:
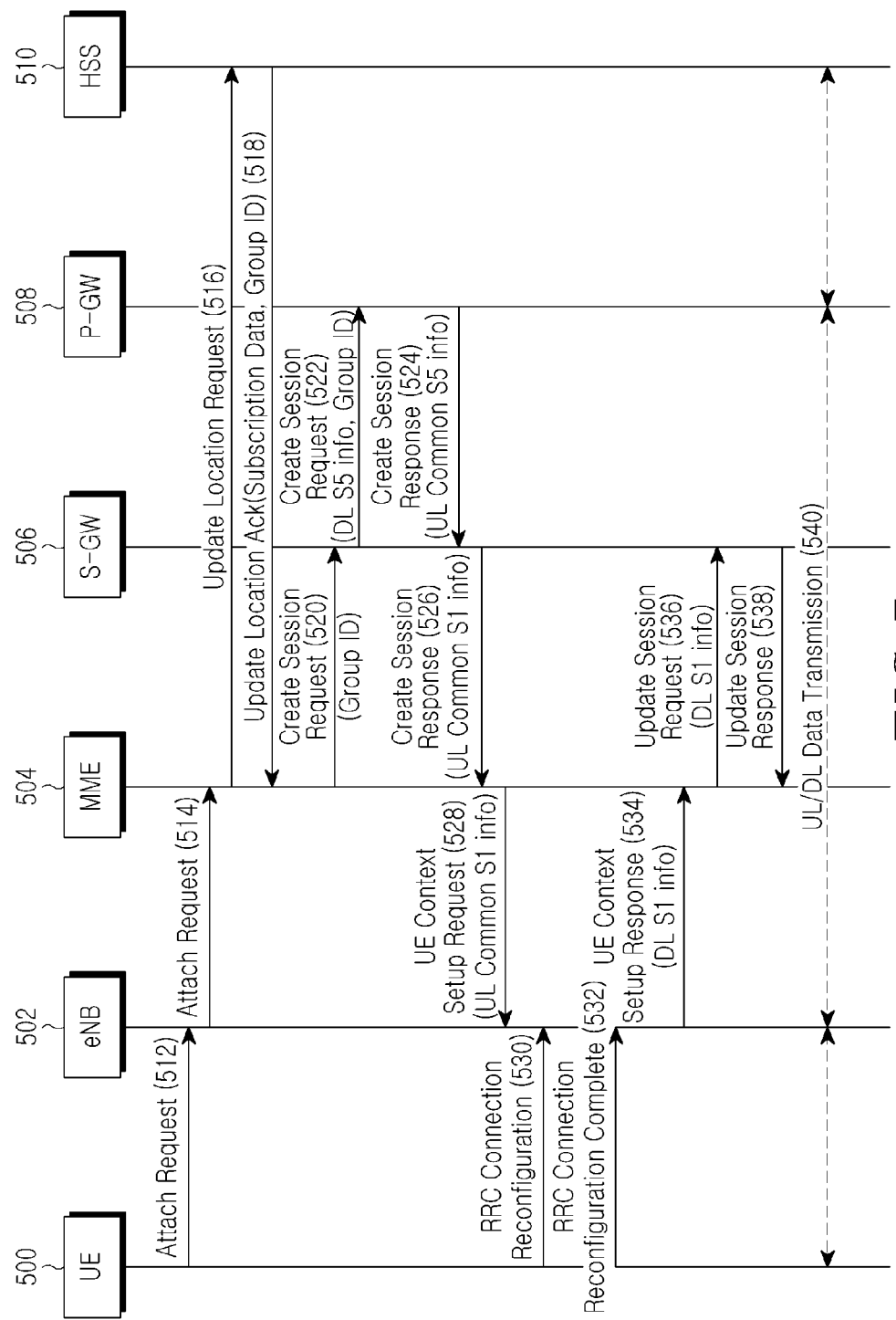
FIG. 5 is a diagram illustrating a flow of setting up a common bearer shared by a plurality of UEs belonging to the same group, and transmitting/receiving data through the common bearer in a wireless communication network in accordance with an exemplary embodiment of the present invention.

FIG. 5 illustrates a flow of setting up a common bearer shared by a plurality of UEs belonging to the same group, and transmitting/receiving data through the common bearer in a wireless communication network according to an exemplary embodiment of the present invention.

Referring to FIG. 5, the wireless communication network shown in the drawing includes a UE 500, an enhanced Node B (eNB) 502, a Mobility Management Entity (MME) 504, an S-GW 506, a P-GW 508, and a Home Subscriber Server (HSS) 510. First, in step 512, the UE 500 sends an attach request message to the eNB 502. Upon receiving the attach request message from the UE 500, the eNB 502 delivers the attach request message to the MME 504 in step 514. In step 516, the MME 504 sends an update location request message to the HSS 510 to thereby report the identification information of the MME 504 serving the subscriber of the UE 500 to the HSS 310 and simultaneously request the HSS 310 to transfer user subscription data. In step 518, the HSS 510 includes the user subscription data and the group IDentifier (ID) of a group, to which the UE 500 belongs, in an update location ACKnowledgement (ACK) message, and delivers the user subscription data and the group ID to the MME 504 by sending the update location ACK message to the MME 504. With regard to this, the group ID may be delivered to the MME 502 by being carried by the attach request message in steps 512 and 514, and specific information for identifying the UE 500, for example, a part of an International Mobile Subscription Identity (IMSI) or an International Mobile Entity Identity (IMEI) may serves as the group ID. In step 520, the MME 504 sends a create bearer request message, which requests the S-GW 506 to create a new 51 bearer, along with the group ID to the S-GW 506.

In the wireless communication network according to the exemplary embodiment of the present invention, the S-GW 506 and the P-GW 508 set up a common bearer, which is shared by a plurality of UEs belonging to the same group, through create bearer request and response messages.

That is, upon receiving the create bearer request message from the MME 504, the S-GW 506 sends a create bearer request message, which requests the P-GW 508 to generate a UL S5 bearer, along with DownLink (DL) S5 bearer information (DL S5 info) and the group ID to the P-GW 508 in step 522. The P-GW 508 then determines if the UL common S5 bearer for the group corresponding to the group ID received in step 522 already exists, and creates a new UL common S5 bearer when the UL common S5 bearer for the group does not exist. Contrarily, when the UL common S5 bearer for the group already exists, the P-GW 508 reuses the UL common S5 bearer. In step 524, the P-GW 508 sends a create bearer response message, which is in response to the create bearer request message in step 522, along with UL common bearer S5 information (UL common S5 info) to the S-GW 506. In this way, the UL common S5 bearer information and the DL S5 bearer information are shared by both the S-GW 506 and the P-GW 508, and thus it can be said that the S5 bearer has been created.

After the common S5 bearer has been created by completing step 524, the S-GW 506 determines if the UL common S1 bearer for the group corresponding to the group ID received in step 520 already exists, and creates a new UL common S1 bearer when the UL common S1 bearer for the group does not exist. Contrarily, when the UL common S1 bearer for the group already exists, the S-GW 506 reuses the UL common S1 bearer. In step 526, the S-GW 506 sends a create bearer response message, which is in response to the create bearer request message for S1 bearer creation in step 520, along with UL common bearer S1 information (UL common S1 info) to the MME 504. In step 528, the MME 504 then sends a UE context setup request message, which requests the eNB 502 to transfer UE context information (UE context info) required for the eNB 502 to provide service to the UE 500, such as security information and mobility restriction information for the UE 500, along with the UL common S1 info to the eNB 502. The eNB 502 performs step 530 (Radio Resource Control (RRC) connection reconfiguration) and step 532 (RRC connection reconfiguration complete) with the UE 500, thereby creating a radio bearer to be used by the UE 500. In step 534, the eNB 502 includes DL bearer S1 information (DL S1 info) in a UE context setup response message that is in response to the UE context setup request message in step 528, and delivers the DL S1 info to the MME 504 by sending the UE context setup response message to the MME 504. The MME 504 sends an update bearer request message including the DL S1 info to the S-GW 506 in step 536, and receives an update bearer response message from the S-GW 506 in step 538, in response to the update bearer request message in step 536. In this way, the UL common S1 bearer information and the DL S1 bearer information are shared by both the eNB 502 and the S-GW 506, and thus it can be said that the common S1 bearer has been created. Accordingly, in step 540, the UE 500 can perform UL data transmission to a data network via the radio bearer-the eNB 502-the UL common S1 bearer-the S-GW 506-the UL common S5 bearer-the P-GW 508.

Reference will now be made to a procedure performed between the S-GW 506 and the P-GW 508 in steps 522 and 524 in which a common bearer shared by a plurality of UEs belonging to the same group is set up.

Figure 6:
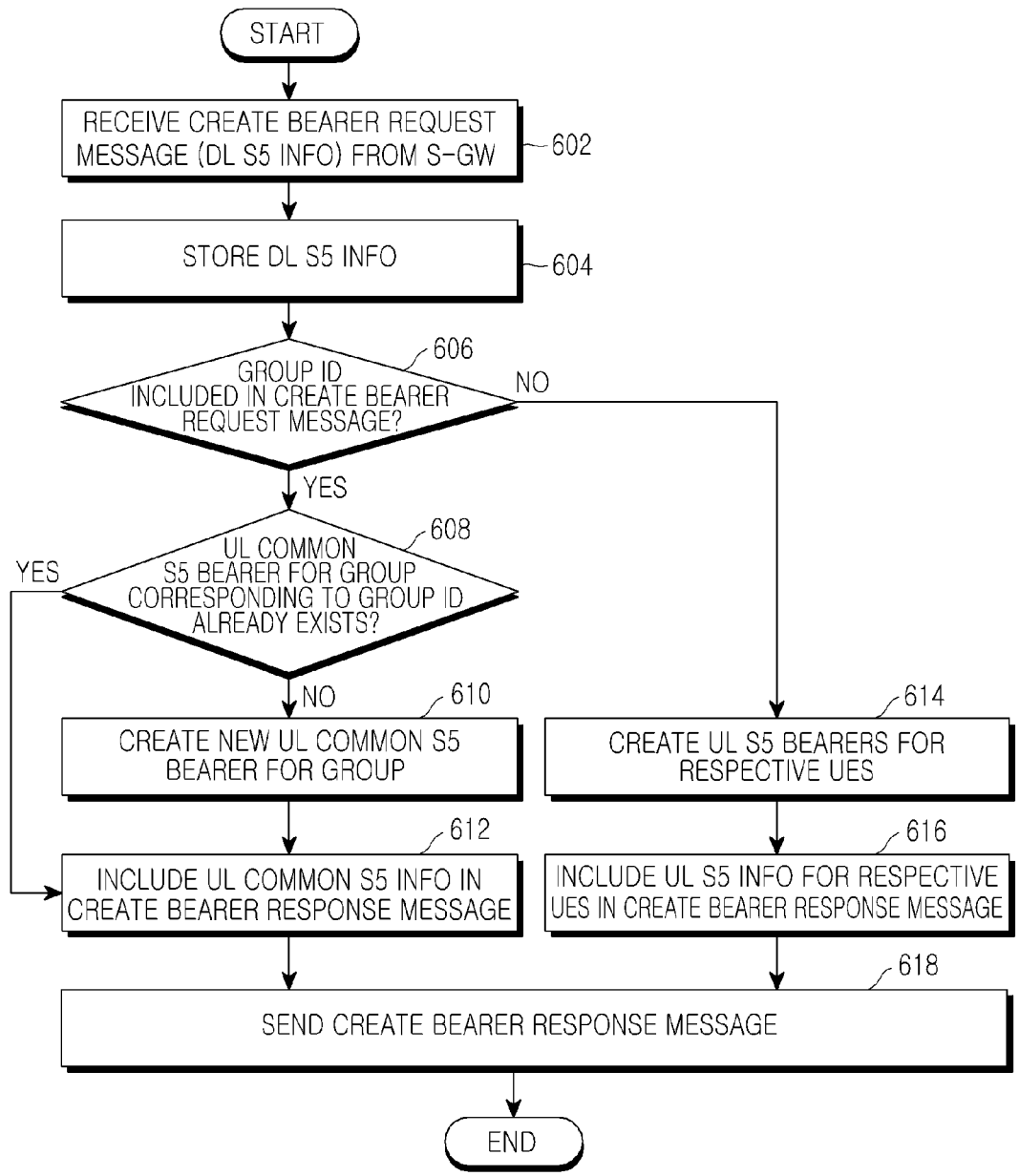
FIG. 6 is a flowchart illustrating a procedure of setting up a common bearer shared by a plurality of UEs and transmitting/receiving data through the common bearer in a wireless communication network in accordance with an exemplary embodiment of the present invention.

FIG. 6 illustrates an operation of the P-GW according to an exemplary embodiment of the present invention. Herein, the P-GW referred to hereafter may be P-GW 508 of FIG. 5.

Referring to FIG. 6, in step 602, the P-GW 508 receives a create bearer request message including DL S5 bearer information from the S-GW 506. Then, the P-GW 508 stores the DL S5 bearer information included in the received create bearer request message in step 604, and determines in step 606 if a group ID is included in the receive create bearer request message. When a group ID is included in the received create bearer request message, the P-GW 508 proceeds to step 608, and determines if the UL common S5 bearer for the group corresponding to the group ID has been already created. When, as a result of the determination in step 608, the UL common S5 bearer already created for the group does not exist, the P-GW 508 proceeds to step 610, creates a new UL common S5 bearer for the group, and then proceeds to step 612. Contrarily, when the UL common S5 bearer already created for the group exists, the P-GW 508 proceeds from step 608 to step 612. In step 612, the P-GW 508 includes the UL common S5 bearer information for the group in a create bearer response message. In step 618, the P-GW 508 sends the create bearer response message to the S-GW 506. In this way, as described above, the UL common S5 bearer information and the DL S5 information are shared by both the S-GW 506 and the P-GW 508, and thus it can be said that the S5 bearer has been created.

Returning to step 606, when a group ID is not included in the create bearer request message, the P-GW 508 proceeds to step 614, and performs the same operation as that of the related art for setting up bearers for respective UEs. That is, the P-GW 508 creates UL S5 bearers for respective UEs in step 614, and includes information on the UL S5 bearers for respective UEs in a create bearer response message in step 616, and then sends the create bearer response message including the information on the UL S5 bearers for respective UEs to the S-GW 506.

As described above, the exemplary embodiments of the present invention provide an environment in which an unnecessary waste of memory resources, state management resources, and the like to be maintained in network nodes, that is, an S-GW and a P-GW, can be prevented by setting up a common bearer shared by a plurality of UEs. Various other effects obtained from the exemplary embodiments of the present invention are directly or implicitly disclosed in the above detailed description of exemplary embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of setting up an UpLink (UL) common bearer in a Serving GateWay (S-GW) of a wireless communication network, the method comprising:
   receiving a group identifier of a User Equipment (UE) from a Mobility Management Entity (MME);
   sending a create bearer request message including the group identifier to a Packet Data Network (PDN) GateWay (P-GW);
   receiving a create bearer response message including UL common S5 bearer information (UL common S5 info) for a group corresponding to the group identifier from the P-GW; and
   sending a create bearer response message including UL common S1 bearer information (UL common S1 info) to the MME.

2. The method as claimed in claim 1, wherein the group identifier is delivered from a Home Subscriber Server (HSS) to the MME.

3. The method as claimed in claim 1, wherein the group identifier comprises one of an International Mobile Subscriber Identity (IMSI) and an International Mobile Entity Identity (IMEI).

4. The method as claimed in claim 1, wherein the group identifier is received in a create bearer request message from the MME.

5. The method as claimed in claim 1, wherein the create bearer request message sent to the P-GW further includes DownLink (DL) S5 bearer information (DL S5 bearer info).

6. A method of setting up an UpLink (UL) common bearer in a Packet Data Network (PDN) GateWay (P-GW) of a wireless communication network, the method comprising:
   receiving a create bearer request message including a group identifier of a User Equipment (UE) from a Serving GateWay (S-GW); and sending a create bearer response message including UL common S5 bearer information (UL common S5 info) for a group corresponding to the group identifier to the S-GW.

7. The method as claimed in claim 6, wherein the create bearer request message received from the S-GW further includes DownLink (DL) S5 bearer information (DL S5 bearer info), the method further comprising storing the DL S5 bearer info included in the create bearer request message received from the S-GW.

8. The method as claimed in claim 6, wherein the sending of the create bearer response message comprises:
- determining if the UL common bearer for the group corresponding to the group identifier already exists;
- when the UL common bearer for the group does not exist, creating a new UL common bearer for the group;
- including information on the created UL common bearer in the create bearer response message; and
- sending the create bearer response message to the S-GW.

9. The method as claimed in claim 6, wherein the sending of the create bearer response message comprises:
- determining if the UL common bearer for the group corresponding to the group identifier already exists;
- when the UL common bearer for the group already exists, including information the UL common bearer that already exits in the create bearer response message; and
- sending the create bearer response message to the S-GW.

10. The method as claimed in claim 9, wherein the group identifier comprises one of an International Mobile Subscriber Identity (IMSI) and an International Mobile Entity Identity (IMEI).

11. An apparatus for setting up an UpLink (UL) common bearer in a wireless communication network, the apparatus comprising:
- a Serving GateWay (S-GW) for receiving a group identifier of a User Equipment (UE) from a Mobility Management Entity (MME), for sending a create bearer request message including the group identifier to a Packet Data Network (PDN) GateWay (P-GW), for receiving a create bearer response message including UL common S5 bearer information (UL common S5 info) for a group corresponding to the group identifier from the P-GW, and for sending a create bearer response message including UL common S1 bearer information (UL common S1 info) to the MME; and
- the P-GW for receiving the create bearer request message from the S-GW, for and generating and sending the create bearer response message including the UL common S5 info.

12. The apparatus as claimed in claim 11, wherein the P-GW determines if the UL common bearer for the group corresponding to the group identifier already exists, creates a new UL common bearer for the group when the UL common bearer for the group does not exist, includes information on the created UL common bearer in the create bearer response message, and sends the create bearer response message to the S-GW.

13. The apparatus as claimed in claim 11, wherein the P-GW determines if the UL common bearer for the group corresponding to the group identifier already exists, when the UL common bearer for the group already exists, includes information on the UL common bearer that already exists in the create bearer response message, and sends the create bearer response message to the S-GW.

14. The apparatus as claimed in claim 11, wherein the group identifier is delivered from a Home Subscriber Server (HSS) to the MME.

15. The apparatus as claimed in claim 11, wherein the group identifier comprises one of an International Mobile Subscriber Identity (IMSI) and an International Mobile Entity Identity (IMEI).

16. The apparatus as claimed in claim 11, wherein the group identifier is received by the S-GW in a create bearer request message from the MME.

17. The apparatus as claimed in claim 11, wherein the create bearer request message sent by the S-GW to the P-GW further includes DownLink (DL) S5 bearer information (DL S5 bearer info).

18. The apparatus as claimed in claim 17, wherein the create bearer request message received by the P-GW from the S-GW further includes DownLink (DL) S5 bearer information (DL S5 bearer info), and wherein the P-GW stores the DL S5 bearer info included in the create bearer request message received from the S-GW.

* * * * *